(12) United States Patent
Low (10) Patent No.: US 8,689,563 B2
(45) Date of Patent: Apr. 8, 2014

(54) FUEL NOZZLE GUIDE PLATE MISTAKE PROOFING

(75) Inventor: Kevin Joseph Low, Portland, CT (US)

(73) Assignee: United Technologies Corporation, Hartford, CT (US)

( * ) Notice: Subject to any disclaimer, the term of this patent is extended or adjusted under 35 U.S.C. 154(b) by 1303 days.

(21) Appl. No.: 12/501,574

(22) Filed: Jul. 13, 2009

(65) Prior Publication Data
US 2011/0005231 A1 Jan. 13, 2011

(51) Int. Cl.
*F23R 3/28* (2006.01)
(52) U.S. Cl.
USPC .................................. 60/748; 60/737; 60/740
(58) Field of Classification Search
USPC .................................... 60/737, 740, 742, 748
See application file for complete search history.

(56) References Cited

U.S. PATENT DOCUMENTS

| | | | |
|---|---|---|---|
| 3,563,470 A * | 2/1971 | Suzuki et al. ................. | 239/402 |
| 3,589,127 A * | 6/1971 | Kenworthy et al. ......... | 60/39.37 |
| 3,667,229 A * | 6/1972 | Cresto ............................. | 60/578 |
| 3,796,134 A * | 3/1974 | Kaptrosky ....................... | 91/418 |
| 4,148,190 A * | 4/1979 | Hayashida ....................... | 60/594 |
| 4,244,278 A * | 1/1981 | Belart et al. ..................... | 91/468 |
| 4,271,675 A * | 6/1981 | Jones et al. ..................... | 60/737 |
| 4,454,711 A | 6/1984 | Ben-Porat | |
| 4,525,996 A * | 7/1985 | Wright et al. ................... | 60/796 |
| 4,582,329 A * | 4/1986 | Stalph ............................. | 277/506 |
| 4,686,823 A * | 8/1987 | Coburn et al. ................. | 60/800 |
| 4,693,074 A * | 9/1987 | Pidcock et al. ................. | 60/740 |
| 4,763,482 A | 8/1988 | Wehner | |
| 5,197,290 A | 3/1993 | Lee et al. | |
| 5,353,599 A | 10/1994 | Johnson et al. | |
| 5,373,693 A * | 12/1994 | Zarzalis et al. ............... | 60/39.23 |
| 5,419,115 A | 5/1995 | Butler et al. | |
| 5,463,864 A | 11/1995 | Butler et al. | |
| 5,577,379 A * | 11/1996 | Johnson ......................... | 60/796 |
| 5,581,999 A | 12/1996 | Johnson | |
| 5,664,412 A * | 9/1997 | Overton ....................... | 60/39.23 |
| 5,916,142 A | 6/1999 | Snyder et al. | |
| 5,924,288 A | 7/1999 | Fortuna et al. | |
| 5,996,335 A | 12/1999 | Ebel | |
| 6,032,457 A | 3/2000 | McKinney et al. | |
| 6,036,191 A * | 3/2000 | Millard ......................... | 277/553 |
| 6,314,739 B1 | 11/2001 | Howell et al. | |
| 6,412,272 B1 | 7/2002 | Titterton, III et al. | |
| 6,427,435 B1 | 8/2002 | Patterson et al. | |
| 6,497,105 B1 | 12/2002 | Stastny | |
| 6,880,341 B2 | 4/2005 | Parkman et al. | |
| 6,896,491 B2 * | 5/2005 | Trubnikov et al. ............ | 417/313 |
| 7,062,920 B2 | 6/2006 | McMasters et al. | |
| 7,104,066 B2 | 9/2006 | Leen et al. | |
| 7,131,273 B2 | 11/2006 | Howell et al. | |
| 7,134,286 B2 | 11/2006 | Markarian et al. | |
| 7,140,189 B2 | 11/2006 | Markarian et al. | |
| 7,415,826 B2 | 8/2008 | McMasters et al. | |
| 7,478,534 B2 | 1/2009 | Guezengar et al. | |
| 7,543,383 B2 * | 6/2009 | Patel et al. ............... | 29/890.142 |

(Continued)

*Primary Examiner* — Ehud Gartenberg
*Assistant Examiner* — Lorne Meade
(74) *Attorney, Agent, or Firm* — Kinney & Lange, P.A.

(57) ABSTRACT

A fuel nozzle guide plate has mirror symmetry about a first plane perpendicular to the fuel nozzle guide plate and mirror symmetry about a second plane parallel to the fuel nozzle guide plate. The fuel nozzle guide plate is attached to an air swirler, which is mounted in an opening of a bulkhead for mixing air and fuel at an upstream side of a combustor.

14 Claims, 5 Drawing Sheets

(56) References Cited

U.S. PATENT DOCUMENTS

| | | |
|---|---|---|
| 7,591,136 B2 | 9/2009 | Bernier et al. |
| 7,617,689 B2 | 11/2009 | Schumacher et al. |
| 7,628,019 B2 * | 12/2009 | Tanner et al. .................. 60/748 |
| 7,721,436 B2 | 5/2010 | Prociw et al. |
| 7,874,164 B2 | 1/2011 | Gandza |
| 7,926,280 B2 | 4/2011 | Morenko et al. |
| 8,015,706 B2 | 9/2011 | Markarian et al. |
| 2006/0207258 A1 * | 9/2006 | Tanner et al. .................. 60/748 |
| 2007/0137208 A1 * | 6/2007 | Prociw et al. .................. 60/748 |
| 2008/0282703 A1 * | 11/2008 | Morenko et al. ................ 60/796 |
| 2009/0025224 A1 * | 1/2009 | Patel et al. ............... 29/890.142 |
| 2010/0058765 A1 | 3/2010 | Duval et al. |

\* cited by examiner

FUEL NOZZLE GUIDE PLATE MISTAKE PROOFING

BACKGROUND

The present disclosure relates generally to gas turbine engines and, more particularly, to a fuel nozzle guide plate for use in a combustor section of a gas turbine engine.

A gas turbine engine includes one or more upstream compressors which provide pressurized air to a combustor. The combustor mixes the pressurized air with fuel and ignites the mixture to create combustion gases that flow downstream into one or more turbines. The turbines extract energy from the combustion gases to power the compressor, as well as power an aircraft, train, ship, or generator.

Fuel nozzles atomize and inject fuel into the combustion section of the gas turbine engine. Surrounding the fuel nozzles are air swirler assemblies, which impart a swirling motion to compressed air for mixing with the fuel. In annular type combustors, each swirler assembly includes a guide plate for centrally receiving the fuel nozzle. U.S. Pat. No. 5,577,379 to United Technologies Corporation and U.S. Pat. No. 7,140,189 to Pratt & Whitney Canada Corp. describe guide plates for receiving fuel nozzles in the upstream portion of a combustor.

SUMMARY

An embodiment of the present disclosure is a fuel nozzle mounting assembly for a combustor. A bulkhead defines an upstream side of the combustor. There is at least one opening in the bulkhead for accommodating injection of fuel and air. An air swirler is mounted in the at least one opening. A fuel nozzle guide plate is attached to the air swirler. The fuel nozzle guide plate has mirror symmetry about a first plane perpendicular to the fuel nozzle guide plate and mirror symmetry about a second plane parallel to the fuel nozzle guide plate.

Another embodiment of the present disclosure is a fuel nozzle mounting assembly for a combustor. An air swirler is mounted in an opening located on an upstream side of the combustor. A fuel nozzle guide plate is attached to an upstream side of the air swirler. The fuel nozzle guide plate includes a collar defining a central aperture for non-binding engagement of the fuel nozzle, and a substantially circular flange surrounding the collar for attaching the fuel nozzle guide plate to the air swirler. The collar has mirror symmetry about a first plane perpendicular to the collar and mirror symmetry about a second plane parallel to the collar. A retainer plate is attached to the upstream end of the air swirler to form an annular track for trapping the substantially circular flange of the fuel nozzle guide plate such that the fuel nozzle guide plate is capable of relative radial (up and down) and circumferential (left to right) movement, but not relative axial movement.

An additional embodiment of the present disclosure is a method of mounting a fuel nozzle in a combustor. The method includes mounting an air swirler in an opening located at an upstream side of the combustor and contacting an upstream side of the air swirler with a fuel nozzle guide plate having a mirror symmetry about a first plane perpendicular to the fuel nozzle guide plate and mirror symmetry about a second plane parallel to the fuel nozzle guide plate. The method also includes trapping the fuel nozzle guide plate against the air swirler with a retainer plate and securing the retainer plate to the air swirler thereby forming a floating connection between the air swirler and the fuel nozzle guide plate.

DETAILED DESCRIPTION

Figure 1:
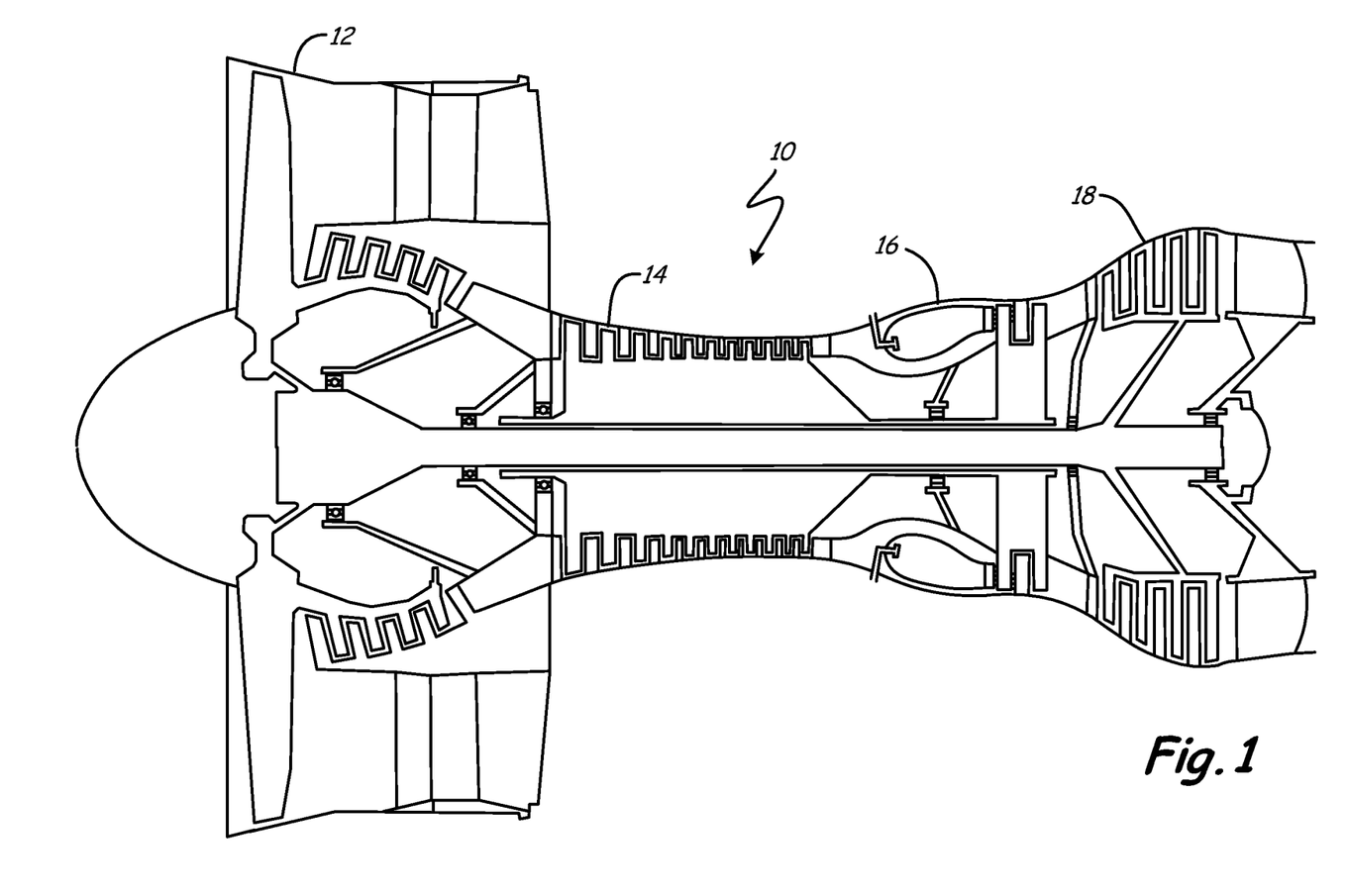
FIG. 1 is a cross-sectional view of a gas turbine engine.

FIG. 1 is a cross sectional view of gas turbine engine 10, which includes four main sections connected to one another in the following order: inlet fan 12, compressor section 14, combustor section 16, and turbine section 18. Air enters gas turbine engine 10 through inlet fan 12 and a portion of the air is directed to the attached compressor section 14. The air is then compressed by a series of rotating blades and static vanes located in compressor section 14. The compressed air is mixed with fuel and ignited in the attached combustor section 16. The resulting combustion exhaust is then directed toward turbine section 18, which also includes blades and vanes. The blades within turbine section 18 extract kinetic energy from the exhaust to turn a shaft (or shafts) thereby providing power to drive inlet fan 12 and compressor section 14. Thrust is provided by inlet fan 12 and the exhaust from turbine section 18.

Figure 2:
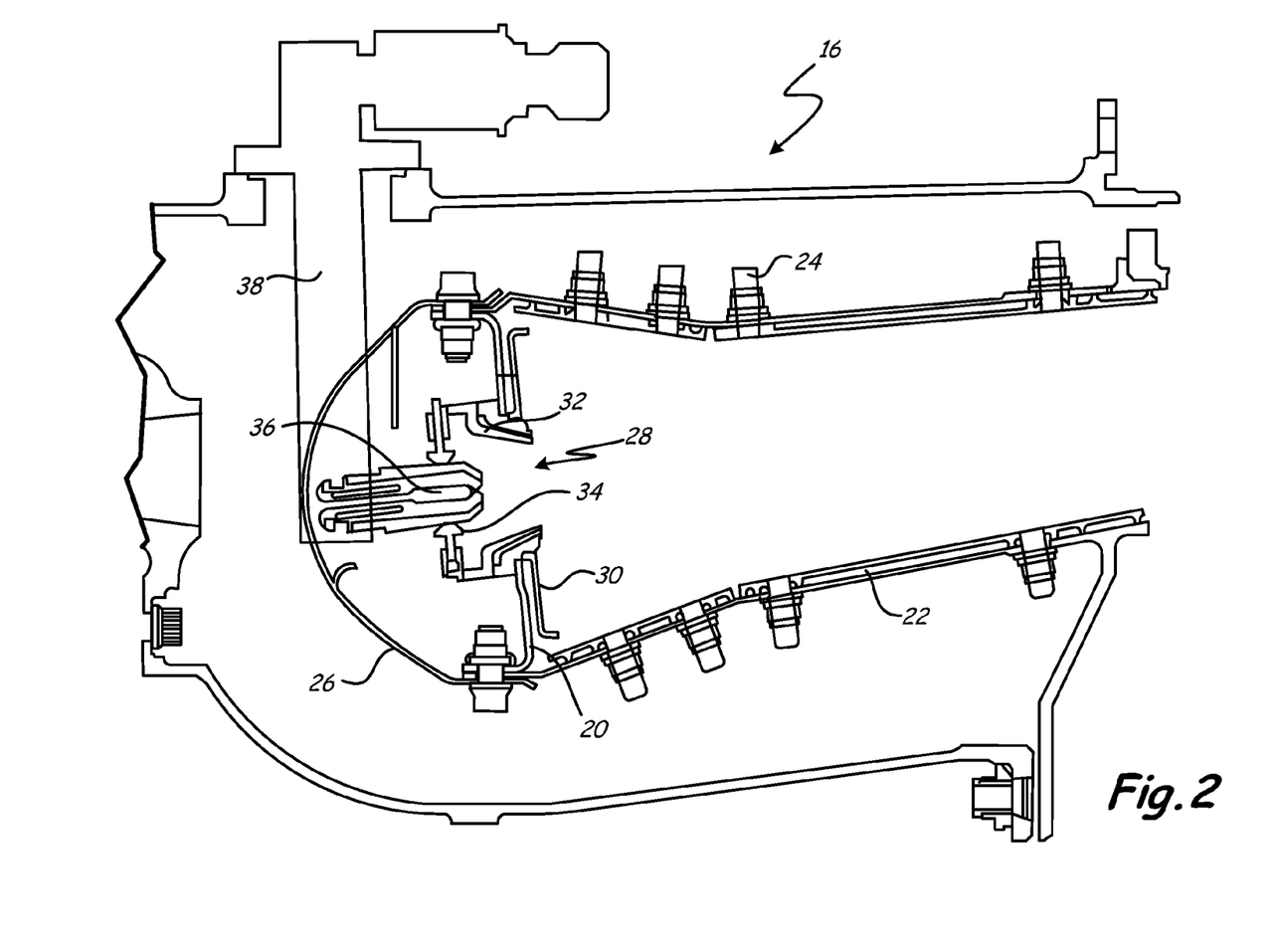
FIG. 2 is an enlarged cross-sectional view of a combustor section of the gas turbine engine from FIG. 1.

FIG. 2 is an enlarged cross-sectional view of combustor section 16 of gas turbine engine 10 from FIG. 1. Depicted in FIG. 2 are components of combustor section 16: bulkhead 20, liner 22, studs 24, cowl 26, bulkhead opening 28, heat shield 30, air swirler 32, fuel nozzle guide plate 34, fuel nozzle tip 36, and fuel nozzle 38. Fuel nozzle guide plate 34 holds fuel nozzle tip 36 in place at an upstream side of combustor section 16.

Bulkhead 20 defines the upstream side of combustion section 16. Attached to and extending in a downstream direction from bulkhead 20 is liner 22. Spaced along and extending into liner 22 are studs 24. Attached to and enclosing an upstream side of bulkhead 20 is semi-circular cowl 26. Bulkhead opening 28 is located in an approximate center of bulkhead 20, opposite an approximate center of circular cowl 26. Heat shield 30 extends downwardly from bulkhead 20 at a location near bulkhead opening 28 toward liner 20. Air swirler 32 extends upstream from bulkhead 20 at a location near bulkhead opening 28 toward cowl 26. Attached to an upstream side of air swirler 32 is fuel nozzle guide plate 34. Fuel nozzle guide plate 34 extends centrally into bulkhead opening 28 to contact fuel nozzle tip 36 around its perimeter. Fuel nozzle 38 extends upwardly from fuel nozzle tip 36 out of cowl 26 to connect with a fuel reservoir where fuel to be supplied to combustion section 16 is stored.

Liner 22 and heat shield 30 are pieces of metal configured to withstand the immense heat characteristic of combustion. Liner 22 and heat shield 30 can include holes to allow secondary cooling air to enter combustion section 16. Studs 24 are located at intervals along liner 22 to fasten liner 22 to a combustor shelf. Bulkhead opening 28 is configured to house fuel and air injection components, such as heat shield 30, air swirler 32, fuel nozzle guide plate 34, and fuel nozzle tip 36. Heat shield 30 is aptly named as it is constructed to shield bulkhead 20 from heat. Air swirler 32 introduces primary air into combustion section 16 and swirls the incoming air to encourage mixing between air and fuel and help combustion. Fuel nozzle guide plate 34 secures fuel nozzle tip 36 within bulkhead opening 28 while allowing for a non-binding attachment between fuel nozzle tip 36 and air swirler 32. Fuel nozzle 38 supplies fuel to fuel nozzle tip 36 for spraying or atomizing fuel introduced into combustion section 16. The fuel nozzle tip 36 mounting assembly, including fuel nozzle guide plate 34 and air swirler 32, is considered in more detail below.

Figure 3:
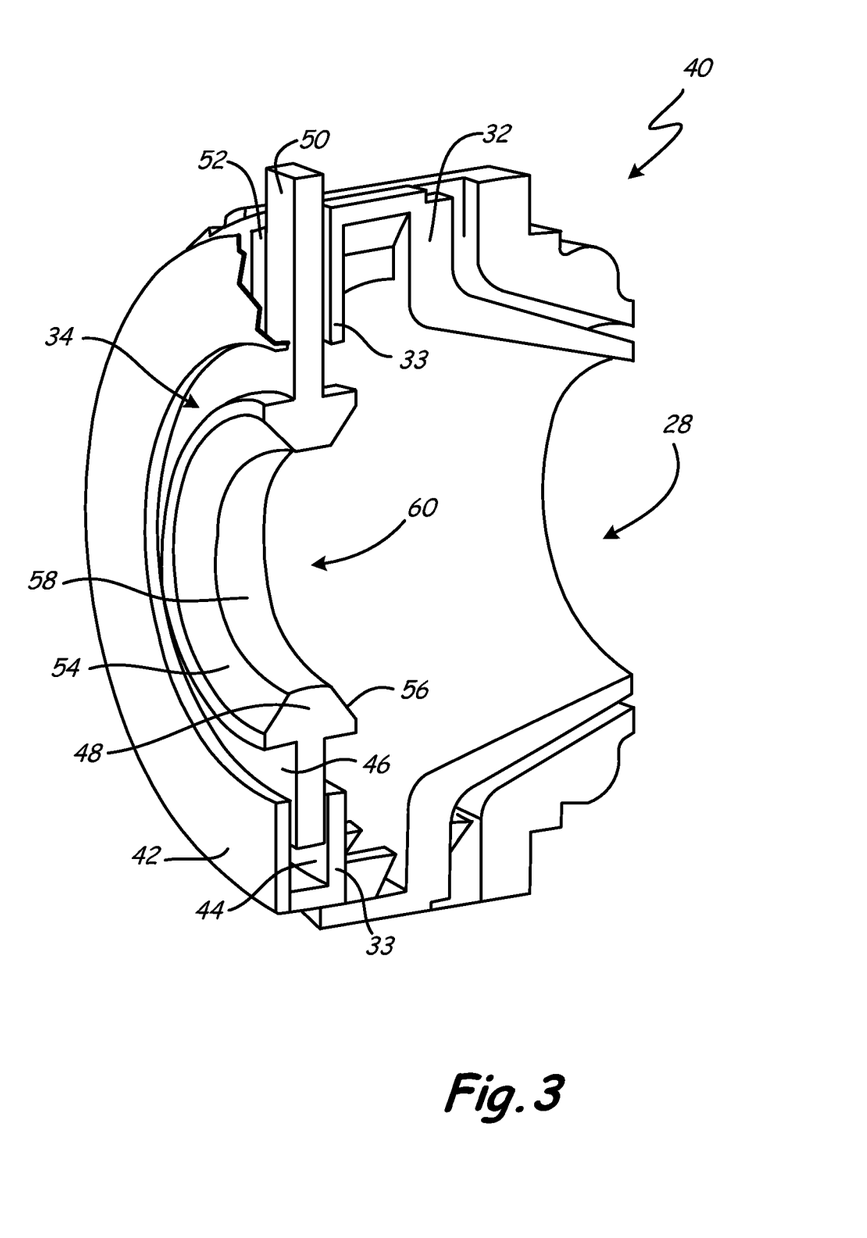
FIG. 3 is an enlarged cross-sectional view of an air swirler in accordance with the present disclosure.

FIG. 3 is an enlarged cross-sectional view of air swirler 32 and bulkhead opening 28 in accordance with the present disclosure. In FIG. 3, fuel nozzle tip 36 is removed to better show the attachment between air swirler 32, fuel nozzle guide plate 34, and retainer plate 42, which collectively form mounting assembly 40. Together retainer plate 42 and air swirler 32 from track 44 having window 52 located therein. For descriptive purposes, fuel nozzle guide plate 34 can be further divided into subcomponents: flange 46, collar 48, tab 50, upstream side 54, downstream side 56, center surface 58, and center aperture 60. Fuel nozzle guide plate 34 is configured to mistake or fool proof construction of mounting assembly 40.

Fuel nozzle guide plate 34 is located between air swirler 32 and retainer plate 42. Air swirler 32 has upstream lip 33 for connecting to fuel nozzle guide plate 34. Air swirler 32 tapers as it extends downstream from lip 33 toward bulkhead opening 28. A downstream side of fuel nozzle guide plate 34 is in contact with upstream lip 33 of air swirler 32, and an upstream side of fuel nozzle guide plate 34 is in contact with, or in close proximity to, retainer plate 42, such that fuel nozzle guide plate 34 is trapped between air swirler 32 and retainer plate 42. Annular track 44 is formed between retainer plate 42 and air swirler 32 during construction of mounting assembly 40. First, circular flange 46 of fuel nozzle guide plate 34 is brought into position relative to upstream lip 33 of air swirler 32. Second, retainer plate 42 is brought into position relative to the upstream side of fuel nozzle guide plate 34 so that fuel nozzle guide plate is located between air swirler 32 and retainer plate 42. Air swirler 32 has upstream lip 33 that attaches to the downstream side of retainer plate 42 thereby forming U-shaped track 44. Track 44 surrounds and traps circular flange 46 of fuel nozzle guide plate 34 between air swirler 32 and retainer plate 42, which can be bolted, welded, or otherwise retained together.

Fuel nozzle guide plate 34 has circular flange 46 with collar 48 extending centrally or inwardly from flange 46. When viewed in cross-section, collar 48 resembles a mushroom head with flange 46 being a stem. Extending outwardly from a top of flange 46 is rectangular tab 50. When viewed in cross section, tab 50 appears to be an extension of the stem (flange 46) of top mushroom (collar 48). Tab 50 extends upwardly into window 52, which is an opening in a top of track 44. Collar 48 can be further divided into upstream edge 54, downstream edge 56, and center surface 58 located there between. Both upstream edge 54 and downstream edge 56 are chamfered and center surface 58 is toroidal or alternatively, surface 58 is cylindrical. Located centrally inside of both flange 46 and collar 48, and defined by an inside diameter of center surface 58, is circular central aperture 60. Since both upstream edge 54 and downstream edge 56 are equally chamfered, either edge 54 or edge 56 can face upstream and act as an upstream edge for fuel nozzle guide plate 34.

Air swirler 32 introduces and swirls air entering combustion section 16 of gas turbine engine. Fuel nozzle guide plate 34 holds fuel nozzle tip 36 (removed) centrally within mounting assembly 40 so that fuel injected by fuel nozzle tip 36 mixes with the swirling air. Air swirler 32 and retainer plate 42 form track 44, which allows for a floating or sliding attachment between fuel nozzle guide plate 34 and air swirler 32. Flange 46 of fuel nozzle guide plate 34 is trapped within track 44, but can float about 0.125 inches (0.318 centimeters) radially to accommodate manufacturing tolerances and/or thermal mismatches. While track 44 allows for radial (up and down) and circumferential (left to right) movement, it restrains axial movement of flange 46. When attaching retainer plate 42 to air swirler 32 thereby forming track 44 around fuel nozzle guide plate 34, care is taken to ensure that tab 50 is located within window 52. Containing tab 50 within window 52 prevents rotation of fuel nozzle guide plate 34 relative to track 44. In an alternative embodiment, the tab 50—window 52 relationship is repeated one or more times around the circumference of flange 46. Chamfers located on upstream edge 54 and downstream edge 56 aide in insertion of fuel nozzle tip 36 into center aperture 60. Center surface 58 is toroidal to accommodate non-binding angular misalignment during insertion of fuel nozzle tip 36 and during engine 10 operation. Since upstream edge 54 and downstream edge 56 are equally chamfered and center surface is toroidal, collar 48 has bilateral symmetry rendering fuel nozzle guide plate 34 incapable of being installed into mounting assembly 40 backwards.

Figure 4A:
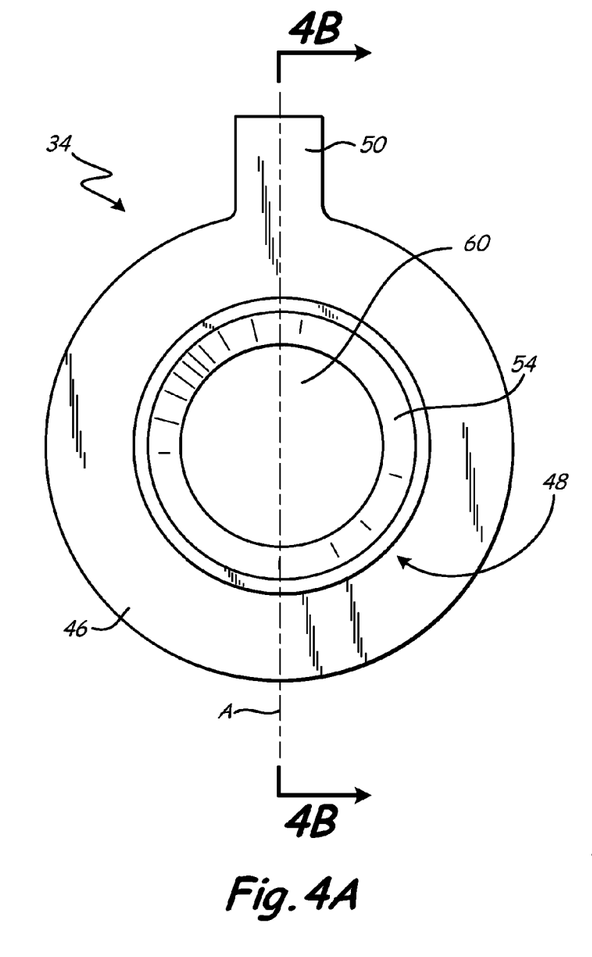
FIG. 4A is a front view and FIG. 4B is a cross-sectional view of the fuel nozzle guide plate from FIG. 3.
Figure 4B:
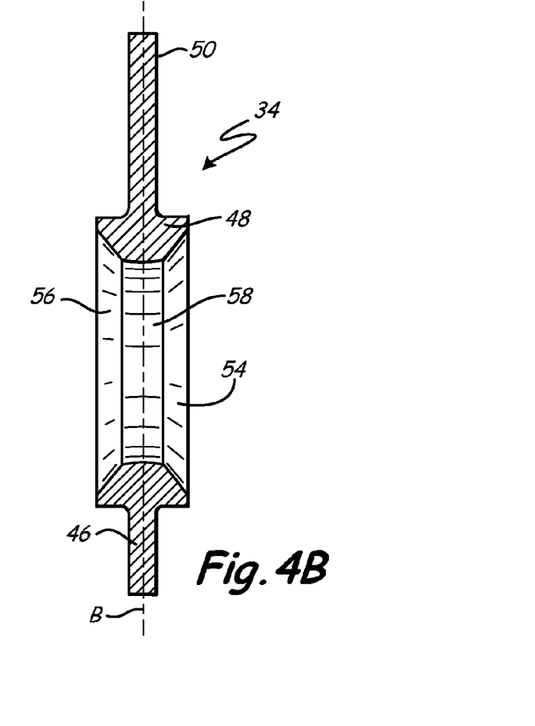

FIG. 4A is a front view and FIG. 4B is a cross-sectional view of fuel nozzle guide plate 34 from FIG. 3. Depicted in FIGS. 4A and 4B are components of fuel nozzle guide plate 34: flange 46, collar 48, tab 50, upstream edge 54, downstream edge 56, center surface 58, and aperture 60. Fuel nozzle guide plate 34 is designed for fool-proof installation into mounting assembly 40. In other words, either upstream edge 54 or downstream edge 56 can face downstream and act as a downstream edge 56.

Fuel nozzle guide plate 34 can be formed from any metal or metal alloy, such as but not limited to, Nickel Alloy or Cobalt Alloy. Flange 46 is substantially circular and surrounds central aperture 60. Collar 48 extends inwardly from flange 46 into central aperture 60 and resembles a mushroom when viewed in cross-section. In an alternative embodiment, collar 48 and flange 46 have similar widths, and a cross-sectional view of this embodiment resembles a crayon. Tab 50 is rectangular and projects outwardly from a top of collar 48 away from central aperture 60 or in direction opposite to collar 48. Upstream edge 54 and downstream edge 56 of collar 48 are both chamfered at about 50 degrees. Center surface 58 is convex and defines an inner diameter of about 0.47 inches (1.194 centimeters) that closely matches an outer diameter of fuel nozzle tip 36. Unlike previous unidirectional fuel nozzle guide plates, fuel nozzle guide plate 34 has planar symmetry about two planes, A and B, rendering fuel nozzle guide plate 34 incapable of being installed incorrectly.

Running vertically through center aperture 60 is first plane A. First plane A is perpendicular to fuel nozzle guide plate 34, which is particularly evident where first plane A bisects tab 50. First plane A divides fuel nozzle guide plate 34 into two equal and symmetrical halves such that fuel nozzle guide plate 34 has mirror symmetry about first plane A. The mirror symmetry about plane A is sometimes known as bilateral symmetry or side-to-side symmetry. Running vertically through center surface 58 is second plane B. Second plane B is parallel to fuel nozzle guide plate 34, which is particularly evident where second plane B bisects collar 48. Second plane B divides fuel nozzle guide plate 34 into two equal and symmetrical halves such that fuel nozzle guide plate 34 has mirror symmetry about second plane B. The mirror symmetry about plane B is sometimes known as front-to-back symmetry. While in the above description collar 48 is explained as having upstream edge 56 and downstream edge 58, these edges can be reversed without causing any ill effect within mounting assembly 40. By incorporating two planes of mirror symmetry into fuel nozzle guide plate 34, construction of mounting assembly 40 is mistake proofed.

Figure 5A:
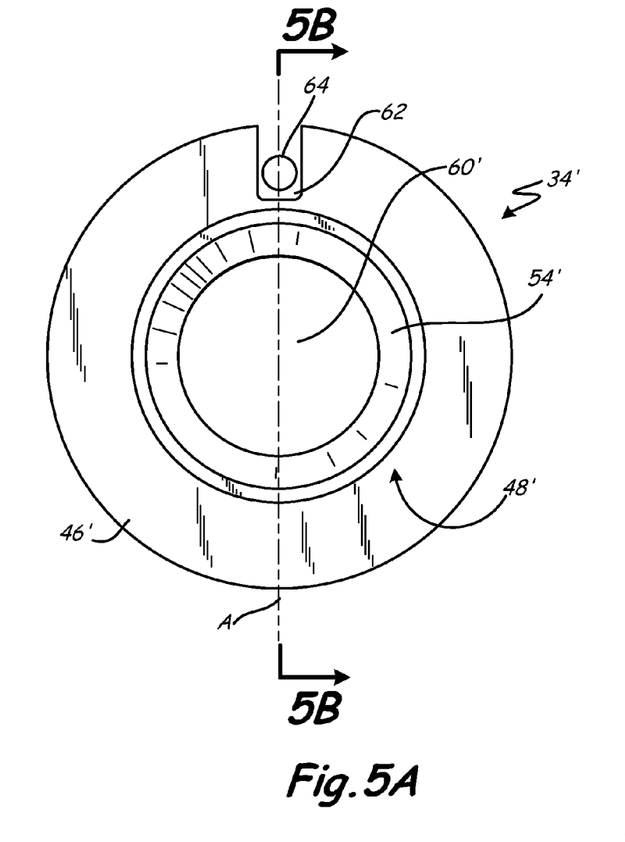
FIG. 5A is a front view and FIG. 5B is a cross-sectional view of an alternative fuel nozzle guide plate.
Figure 5B:
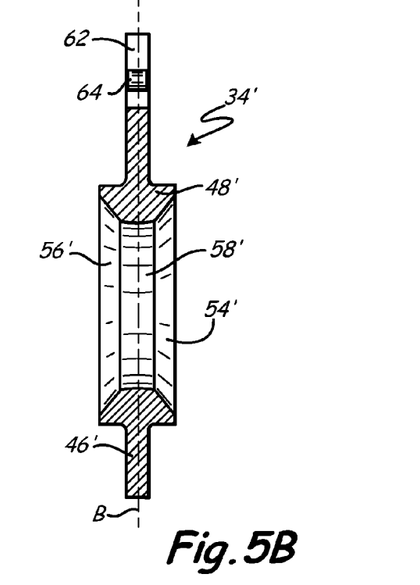

FIG. 5A is a front view and FIG. 5B is a cross-sectional view of an alternative fuel nozzle guide plate 34'. Depicted in FIGS. 5A and 5B are components of fuel nozzle guide plate 34': flange 46', collar 48', upstream edge 54', downstream edge 56', center surface 58', aperture 60', and slot 62. Also shown is pin 64, which is a component of either air swirler 32' or retainer plate 42'.

Fuel nozzle guide plate 34' is substantially similar to fuel nozzle guide plate 34 described above. Fuel nozzle guide plate 34' has planar symmetry about two planes, A and B, rendering fuel nozzle guide plate 34' incapable of being installed incorrectly. Fuel nozzle guide plate 34' differs from fuel nozzle guide plate 34 in that the tab 50—window 52 relationship is replaced by a slot 62—pin 64 relationship. Like the tab 50—window 52 relationship, the slot 62—pin 64 relationship serves as an anti-rotation feature. Pin 64 protrudes from either air swirler 32' or retainer plate 42' and engages slot 62 of fuel nozzle guide plate 34' to prevent inadvertent rotation therebetween. While one slot 62 and one pin 64 are depicted in FIGS. 5A and 5B, additional anti-rotation features can be incorporated around the circumference of flange 34'.

Vertical, horizontal, top, bottom, inward, outward, upstream, and downstream have been used through the specification to help define relative directions. Although the present invention has been described with reference to preferred embodiments, workers skilled in the art will recognize that changes may be made in form and detail without departing from the spirit and scope of the invention.

The invention claimed is:

1. A fuel nozzle mounting assembly for a combustor, the mounting assembly comprising:
   a bulkhead defining an upstream side of the combustor;
   at least one opening in the bulkhead for accommodating injection of fuel and air;
   an air swirler mounted in the at least one opening;
   a fuel nozzle guide plate attached to the air swirler, the fuel nozzle guide plate having:
      a central aperture for receiving a fuel nozzle;
      a collar surrounding the central aperture, the collar being configured for non-binding engagement of the fuel nozzle, and including an upstream chamfer, a downstream chamfer, and a convex surface located between the upstream chamfer and the downstream chamfer;
      a substantially circular flange surrounding the collar for attaching the fuel nozzle guide plate to the air swirler, wherein a cross-sectional view of the collar and the substantially circular flange is mushroom shaped with the upstream chamfer and the downstream chamfer converging radially inward toward the convex surface of the collar, and the substantially circular flange being smaller in width than the collar and extending radially outward away from the collar; and
   mirror symmetry about a first plane perpendicular to the fuel nozzle guide plate and mirror symmetry about a second plane parallel to the fuel nozzle guide plate, wherein the mirror symmetry about the first plane perpendicular to the collar is side to side symmetry and the mirror symmetry about the second plane perpendicular to the collar is front to back symmetry.

2. The mounting assembly of claim 1, further comprising:
   a retainer plate attached to the air swirler to form an annular track for attachment of the fuel nozzle guide plate.

3. The mounting assembly of claim 2, wherein the fuel nozzle guide plate includes a substantially circular flange surrounding the central aperture, the flange received by the annular track such that axial movement is substantially restrained, but radial movement is permitted.

4. The mounting assembly of 3, wherein the annular track includes a cut out window.

5. The mounting assembly of claim 4, wherein a tab extends from the flange and is received by the window to prevent rotation of the fuel nozzle guide plate with respect to the annular track.

6. The mounting assembly of claim 5, wherein the collar includes a convex surface located between the upstream chamfer and the downstream chamfer.

7. The mounting assembly of claim 6, wherein the collar has mirror symmetry about the second plane parallel to the fuel nozzle guide plate.

8. A fuel nozzle mounting assembly for a combustor, the mounting assembly comprising:
   an air swirler mounted in an opening located on an upstream side of the combustor;
   a fuel nozzle guide plate attached to an upstream side of the air swirler, the fuel nozzle guide plate comprising:
      a collar defining a central aperture for non-binding engagement of the fuel nozzle, the collar including an upstream chamfer, a downstream chamfer, a convex surface located between the upstream chamfer and the downstream chamfer, and having mirror symmetry about a first plane perpendicular to the collar and mirror symmetry about a second plane parallel to the collar, wherein the mirror symmetry about the first plane perpendicular to the collar is side to side symmetry and the mirror symmetry about the second plane perpendicular to the collar is front to back symmetry; and
      a substantially circular flange surrounding the collar for attaching the fuel nozzle guide plate to the swirler, wherein a cross-sectional view of the collar and the substantially circular flange is mushroom shaped with the upstream chamfer and the downstream chamfer converging radially inward toward the convex surface of the collar, and the substantially circular flange being smaller in width than the collar and extending radially outward away from the collar; and
   a retainer plate attached to the upstream end of the air swirler to form an annular track for trapping the substantially circular flange of the fuel nozzle guide plate such that the fuel nozzle guide plate is capable of relative radial and circumferential movement, but not relative axial movement.

9. The mounting assembly of claim 8, wherein the collar has a small, predetermined internal diameter at an approximate center of the convex surface for non-binding engagement of a fuel nozzle.

10. The mounting assembly of claim 8, further comprising:
    a fuel nozzle extending through the central aperture and contacting the collar at the small, predetermined diameter.

11. A method of mounting a fuel nozzle in a combustor using the fuel nozzle mounting assembly of claim 8, the method comprising:
    mounting the air swirler in the opening located at the upstream side of the combustor;

contacting the upstream side of the air swirler with the fuel nozzle guide plate;

trapping the guide plate against the air swirler with the retainer plate;

securing the retainer plate to the air swirler thereby forming a floating connection between the air swirler and the fuel nozzle guide plate; and inserting the fuel nozzle into an upstream side of the fuel nozzle guide plate past the upstream chamfer and toward the downstream chamfer located on an opposite, downstream side.

12. The method of claim 11, further comprising:

aligning a tab extending from the fuel nozzle guide plate with a window located between the air swirler and the retainer plate.

13. The method of claim 12, wherein trapping the fuel nozzle guide plate against the air swirler includes forming the annular track for receiving the fuel nozzle guide plate therein.

14. The method of claim 13, wherein securing the retainer plate to the swirler includes welding or bolting the retainer plate to the air swirler.

* * * * *